United States Patent
Enyedy

(10) Patent No.: US 8,822,884 B2
(45) Date of Patent: Sep. 2, 2014

(54) WELDING APPARATUS PROVIDING AUXILIARY POWER

(75) Inventor: Edward A. Enyedy, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1930 days.

(21) Appl. No.: 11/834,791

(22) Filed: Aug. 7, 2007

(65) Prior Publication Data

US 2009/0039064 A1    Feb. 12, 2009

(51) Int. Cl.
*B23K 9/10* (2006.01)
*B23K 9/12* (2006.01)

(52) U.S. Cl.
CPC ............... *B23K 9/1006* (2013.01); *B23K 9/12* (2013.01)
USPC ...................... 219/132; 219/130.1; 219/137.7

(58) Field of Classification Search
USPC .................... 219/130.1, 130.5, 132, 137.7
See application file for complete search history.

(56) References Cited

U.S. PATENT DOCUMENTS

| | | | |
|---|---|---|---|
| 4,216,367 A * | 8/1980 | Risberg | 219/132 |
| 4,705,934 A | 11/1987 | Winkler | |
| 5,250,786 A | 10/1993 | Kikuchi et al. | |
| 5,338,917 A * | 8/1994 | Stuart et al. | 219/137.63 |
| 6,021,361 A * | 2/2000 | Taninaga et al. | 700/182 |
| 6,525,282 B2 * | 2/2003 | Krebs et al. | 200/298 |
| 6,906,285 B2 * | 6/2005 | Zucker et al. | 219/132 |
| 7,161,272 B2 | 1/2007 | Enyedy et al. | |
| 7,176,411 B2 | 2/2007 | Enyedy | |
| 7,204,709 B2 | 4/2007 | Justice | |
| 2003/0164645 A1 | 9/2003 | Crandell et al. | |
| 2006/0027547 A1 * | 2/2006 | Silvestro | 219/133 |
| 2006/0255027 A1 * | 11/2006 | Katiyar | 219/145.22 |
| 2007/0039935 A1 | 2/2007 | Justice | |
| 2007/0151965 A1 * | 7/2007 | Mormino, Jr. | 219/137.2 |
| 2007/0181547 A1 * | 8/2007 | Vogel et al. | 219/130.1 |

FOREIGN PATENT DOCUMENTS

JP    59-070468 A    4/1984

* cited by examiner

*Primary Examiner* — Henry Yuen
*Assistant Examiner* — Ayub Maye
(74) *Attorney, Agent, or Firm* — Hahn Loeser & Parks LLP

(57) ABSTRACT

Welding wire feeders and a stick electrode holder capable of providing auxiliary electric power from a welding power source via an electrode cable to an auxiliary welding tool. A welding output of the welding power source may be switched between a regulated primary power and a regulated auxiliary power. An auxiliary welding tool, when connected to the welding wire feeder or the stick electrode holder, may use the regulated auxiliary power provided via the electrode cable when the regulated auxiliary power is selected.

14 Claims, 3 Drawing Sheets

WELDING APPARATUS PROVIDING AUXILIARY POWER

INCORPORATION BY REFERENCE

U.S. Pat. No. 6,906,285 issued on Jun. 14, 2005 is incorporated herein by reference in its entirety. U.S. Pat. No. 7,176,411 issued on Feb. 13, 2007 is incorporated herein by reference in its entirety. U.S. Pat. No. 7,204,709 issued on Apr. 17, 2007 is incorporated herein by reference in its entirety. U.S. Pat. No. 7,161,272 issued on Jan. 9, 2007 is incorporated herein by reference in its entirety. U.S. patent application Ser. No. 11/205,940 filed on Aug. 17, 2005, and having U.S. Publication No. 2007/0039935, is incorporated herein by reference in its entirety.

TECHNICAL FIELD

Certain embodiments relate to providing auxiliary electric power. More particularly, certain embodiments relate to welding apparatus providing auxiliary power to auxiliary welding tools via a welding output of a welding power source.

BACKGROUND

People working as arc welders often use auxiliary welding tools such as, for example, grinders to prepare and re-work parts for welding. Grinders come in many shapes and configurations, with right angle grinders being very common. Other auxiliary welding tools may include, for example, lights to illuminate the work area or cutting tools to cut a workpiece.

Some auxiliary welding tools are battery powered, while others are "corded" and are powered from, for example, 115 VAC or VDC. Both styles have drawbacks. For example, battery powered tools do not typically have enough charge to last all day in industrial applications. Corded units add yet another electrical cord to the work area which could be tripped over, or which may create an electrical hazard.

Often at large fabrication sites, the welding power source is remotely positioned from the wire feeder (e.g., up to 100 feet or more). To position an auxiliary welding tool, such as a grinder, close to the wire feeder where the operator is welding, 100 feet or more of electrical extension cord may be required.

Customers may prefer to be able to connect an auxiliary welding tool directly to the wire feeder. However, because of electrical guide lines from organizations such as, for example, the IEC and CSA, supplying high voltages (greater than 50 volts) through the wire feeder control cable incurs significantly greater insulation requirements such that the wire feeder is no longer cost competitive.

For example, certain newer wire feeders use 42 VAC or 40 VDC. Some wire feeders are powered by the arc voltage. Many new welding power sources are inverter or chopper based. Equipped with sophisticated electronics, such power sources are capable of regulating complex waveforms. DC pulse waveforms are common, and some machines regulate AC square wave pulses. Although rarely used in a welding arc, some machines are capable of creating AC sine wave outputs.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY

An embodiment of the present invention comprises a welding wire feeder. The welding wire feeder includes an electrode cable connector adapted to electrically connect with a first electrical connector at a distal end of a welding electrode cable to provide electric power from a welding power source. The wire feeder further includes a primary welding tool connector adapted to electrically connect with a second electrical connector at a distal end of a primary welding tool. The wire feeder also includes an auxiliary welding tool connector adapted to electrically connect with a third electrical connector at a distal end of an auxiliary welding tool. The wire feeder also includes means for alternately switching the electric power, provided to the electrode cable connector via the electrode cable from the power source, between the primary welding tool connector and the auxiliary welding tool connector.

Another embodiment of the present invention comprises a welding wire feeder. The welding wire feeder includes first means for electrically connecting with a distal end of a welding electrode cable to provide electric power to the wire feeder from a welding power source. The welding wire feeder further includes second means for electrically connecting with a distal end of a primary welding tool and third means for electrically connecting with a distal end of an auxiliary welding tool. The welding wire feeder also includes fourth means for routing the electric power from the first means to the second means and the third means within the wire feeder.

A further embodiment of the present invention comprises a welding system. The welding system includes a welding power source having an electrical power output to provide electric power. The welding system further includes an electrode holder adapted to electrically connect with an auxiliary welding tool. The welding system also includes an electrode cable adapted to electrically connect the electrode holder with the electrical power output of the welding power source to provide the electric power from the welding power source to the electrode holder and the auxiliary welding tool. The welding system further includes means for remotely switching the electric power provided by the welding power source between a regulated primary power and a regulated auxiliary power.

These and other advantages and novel features of the present invention, as well as details of illustrated embodiments thereof, will be more fully understood from the following description and drawings.

DETAILED DESCRIPTION

Figure 1:
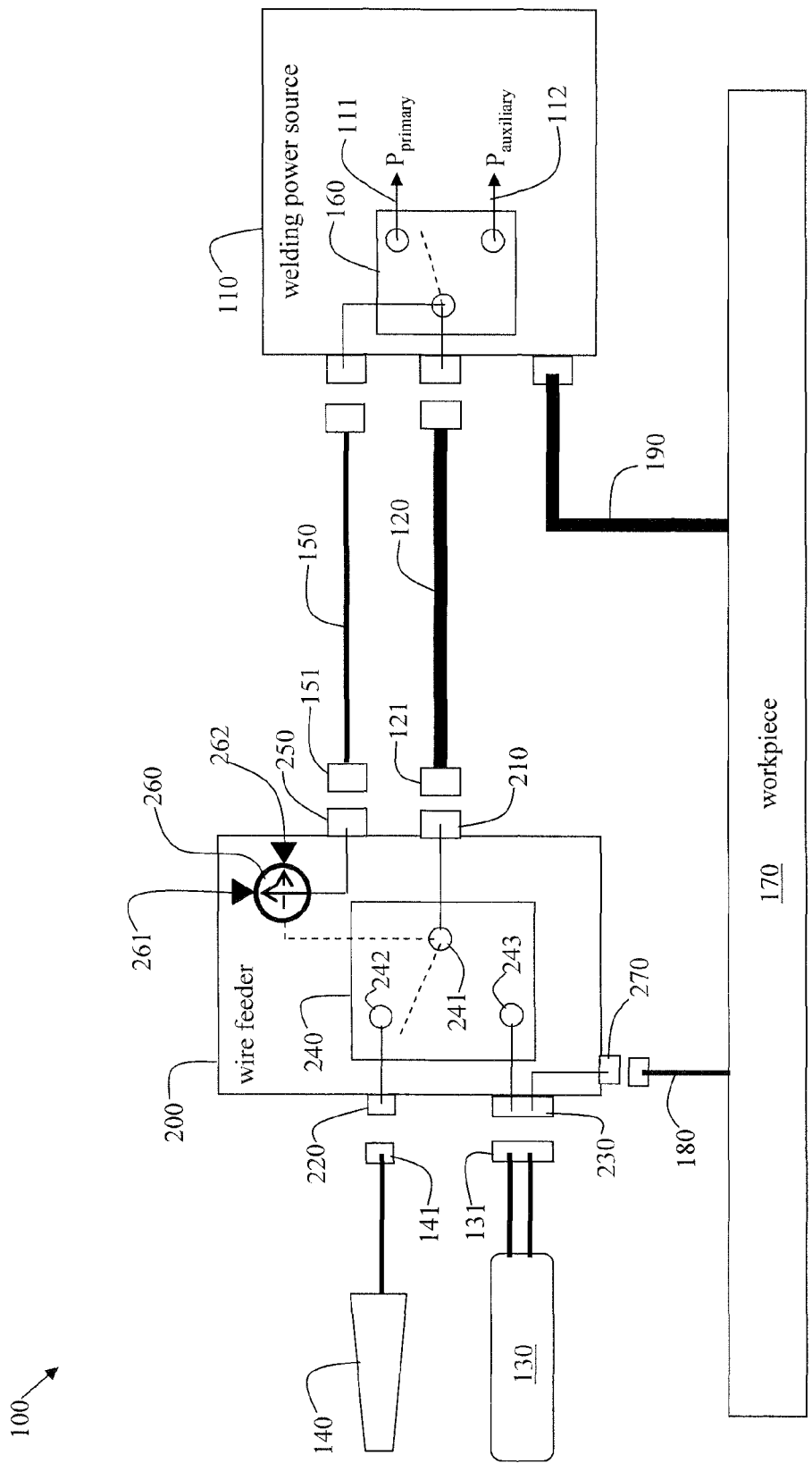
FIG. 1 is a schematic block diagram of a first embodiment of a welding wire feeder, used in a welding system, capable of providing auxiliary electric power from a welding power source via an electrode cable to an auxiliary welding tool.

FIG. 1 is a schematic block diagram of a first embodiment of a welding wire feeder 200, used in a welding system 100, capable of providing auxiliary electric power from a welding power source 110 via an electrode cable 120 to an auxiliary welding tool 130. The welding wire feeder 200 includes an electrode cable connector 210 adapted to electrically connect with a first electrical connector 121 at a distal end of the welding electrode cable 120 to provide electric power from the welding power source 110. Further details of various exemplary welding wire feeders and connectors can be found in U.S. Pat. No. 6,906,285, U.S. Pat. No. 7,176,411, U.S. Pat. No. 7,204,709, U.S. Pat. No. 7,161,272, and U.S. Patent Application No. 2007/0039935 which are incorporated herein by reference.

The welding wire feeder 200 also includes a primary welding tool connector 220 adapted to electrically connect with a second electrical connector 141 at a distal end of a primary welding tool 140 (e.g., a welding gun), and an auxiliary welding tool connector 230 adapted to electrically connect with a third electrical connector 131 at a distal end of the auxiliary welding tool 130 (e.g., a grinder). The welding wire feeder 200 further includes a means for alternately switching the electric power, provided to the electrode cable connector 210 via the electrode cable 120 from the power source 110, between the primary welding tool connector 220 and the auxiliary welding tool connector 230. Such a means may include, for example, a switch 240. Other equivalent means are possible as well, in accordance with various alternative embodiments of the present invention.

The switch 240 may be a manually activated mechanical or electrical switch, or an automatically activated mechanical or electrical switch, for example. Referring to the embodiment of FIG. 1, electric power comes into the wire feeder at terminal 241 of the switch 240 via connector 210 and is routed or switched to either terminal 242 (for use by the primary welding tool 140) or terminal 243 (for use by the auxiliary welding tool 130).

A means for selecting the electric power, provided to the electrode cable 120 from the welding power source 110, from at least a regulated primary power 111 and a regulated auxiliary power 112 is also provided. Such a means may include, for example, a control cable connector 250 adapted to electrically connect with a fourth electrical connector 151 at a distal end of a control cable 150 to provide control signals between the wire feeder 200 and the welding power source 110. The means for selecting the electric power may also include a mechanical dial or knob 260 on the welding wire feeder 200, allowing an operator to select between a primary power position 261 and an auxiliary power position 262. The dial or knob 260 electrically interfaces with the connector 250 to send a control signal down the control cable 150 to the welding power source 110. Alternatively, instead of a mechanical dial or knob, the means for selecting the electric power may include a touch-screen panel or a simple switch, for example, on the wire feeder 200. Other equivalent means are possible as well, in accordance with various alternative embodiments of the present invention.

The control signal may activate a switch 160 within the welding power source 110 to switch between the regulated primary power 111 and the regulated auxiliary power 112, both produced by the welding power source 110. For example, the switch 160 may be a single inverter that changes its output. In accordance with an embodiment of the present invention, the same dial, knob, touch-screen panel, or switch 260 (i.e., means for selecting the electric power) may also be used to activate the switch 240 (i.e., means for alternately switching the electric power) within the welding wire feeder 200. Alternatively, a separate means may be used to activate the switch 240 (e.g., a separate dial, knob, touch-screen panel, or switch on the wire feeder 200).

Some welding power sources already provide auxiliary power which has nothing to do with electrode power applied to the electrode cable. That is, a welding power source may have a separate circuit that is isolated from the welding circuit and supplies, for example, 115 VAC and is called auxiliary power. In accordance with an embodiment of the present invention, an electrode power (i.e., a power to be applied to the electrode cable) may be generated which is equivalent to another auxiliary power already provided by the power source (e.g., 115 VAC or 115 VDC). Alternatively, the other auxiliary power already provided by the power source may simply be switched into the electrode line to become the electrode power.

The welding wire feeder 200 further includes a means for electrically grounding the auxiliary welding tool 130 to a workpiece 170. Referring to FIG. 1, such means may include an electrical connector 270 adapted to electrically connect with an auxiliary work cable 180 which electrically interfaces with the workpiece 170. The connector 270 also electrically interfaces with the connector 230 for the auxiliary welding tool 130 such that the auxiliary welding tool 130 may be grounded to the workpiece 170, as shown in FIG. 1. Other equivalent means are possible as well, in accordance with various alternative embodiments of the present invention. Similarly, a work cable 190 is used to electrically ground the power source 110 to the workpiece 170.

When primary power 111 is connected to the primary welding tool 140 via the switch 240, a first closed electrical path is established when an electrode of the primary welding tool 140 touches the workpiece 170 or when an arc is established between an electrode of the primary welding tool 140 and the workpiece 170. The first closed electrical path runs from the power source 110 through the electrode cable 120, into the electrode connector 210 of the welding wire feeder 200, through the switch 240 to the connector 220, into the primary welding tool 140, to the workpiece 170 (either via a direct short or an arc), through the work cable 190, and back to the power source 110.

When auxiliary power 112 is connected to the auxiliary welding tool 130 via the switch 240, a second closed electrical path is established. The second closed electrical path runs from the power source 110, through the electrode cable 120, into the electrode connector 210 of the welding wire feeder 200, through the switch 240 to the connector 230, into the auxiliary welding tool 130, out of the auxiliary welding tool 130, back to the connector 230, to the connector 270, through the auxiliary work cable 180, to the workpiece 170, through the work cable 190, and back to the power source 110. In addition, the wire feeder 200 may include a safety circuit or safety configuration to prevent primary power from being applied to the auxiliary welding tool 130, and to prevent auxiliary power from being applied to the primary welding tool 140.

As a result, the same electrode cable 120 may be used to provide power for both the primary welding tool 140 and the auxiliary welding tool 130, instead of having two separate cables, one for the primary welding tool 140 and another for the auxiliary welding tool 130. Eliminating the need for an extra cable helps reduce the likelihood of tripping and electrical hazard in the work area.

Figure 2:
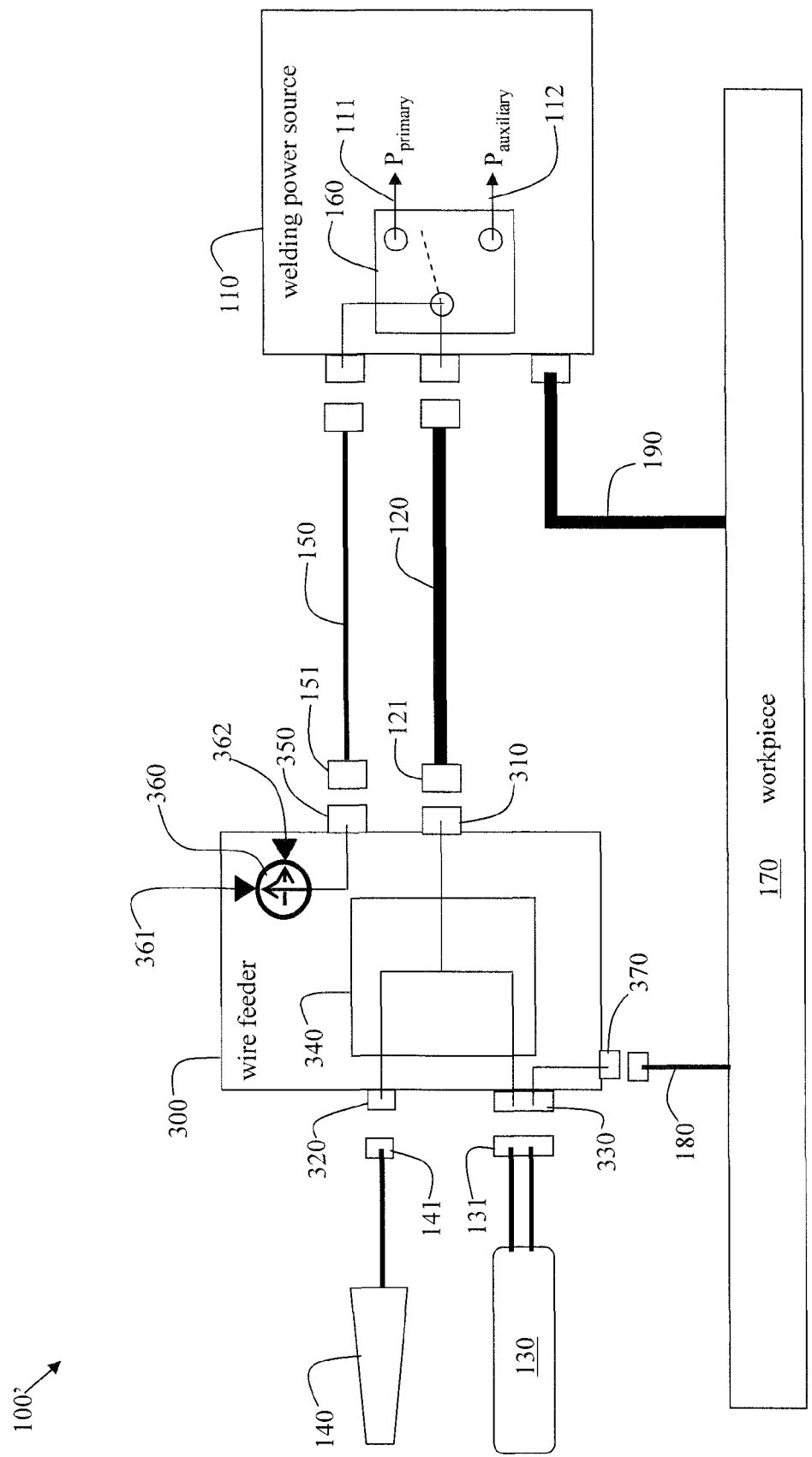
FIG. 2 is a schematic block diagram of a second embodiment of a welding wire feeder, used in a welding system, capable of providing auxiliary electric power from a welding power source via an electrode cable to an auxiliary welding tool.

FIG. 2 is a schematic block diagram of a second embodiment of a welding wire feeder 300, used in a welding system 100', capable of providing auxiliary electric power from a welding power source 110 via an electrode cable 120 to an auxiliary welding tool 130. The welding wire feeder 300 is very similar to the welding wire feeder 200 of FIG. 1. The welding wire feeder 300 includes an electrode cable connector 310 adapted to electrically connect with the first electrical connector 121 at a distal end of the welding electrode cable 120 to provide electric power from the welding power source 110.

The welding wire feeder 300 also includes a primary welding tool connector 320 adapted to electrically connect with the second electrical connector 141 at a distal end of the primary welding tool 140 (e.g., a welding gun), and an auxiliary welding tool connector 330 adapted to electrically connect with the third electrical connector 131 at a distal end of the auxiliary welding tool 130 (e.g., a light). The welding wire feeder 300 further includes a means for routing the electric power, provided to the electrode cable connector 310 via the electrode cable 120 from the power source 110, to the primary welding tool connector 320 and the auxiliary welding tool connector 330. Such a means may include, for example, a power splitter 340 or hard wiring. Other equivalent means are possible as well, in accordance with various alternative embodiments of the present invention. Referring to the embodiment of FIG. 2, electric power comes into the power splitter 340 of the wire feeder 300 via connector 310 and is routed to both connector 320 (for use by the primary welding tool 140) and connector 330 (for use by the auxiliary welding tool 130).

A means for selecting the electric power, provided to the electrode cable 120 from the welding power source 110, from at least a regulated primary power 111 and a regulated auxiliary power 112 is also provided. Such a means may include, for example, a control cable connector 350 adapted to electrically connect with a fourth electrical connector 151 at a distal end of the control cable 150 to provide control signals between the wire feeder 300 and the welding power source 110. The means for selecting the electric power may also include a mechanical dial or knob 360 on the welding wire feeder 300, allowing an operator to select between a primary power position 361 and an auxiliary power position 362. The dial or knob 360 electrically interfaces with the connector 350 to send a control signal down the control cable 150 to the welding power source 110. Alternatively, instead of a mechanical dial or knob, the means for selecting the electric power may include a touch-screen panel or a simple switch, for example, on the wire feeder 300. Other equivalent means are possible as well, in accordance with various alternative embodiments of the present invention. The control signal may activate a switch 160 within the welding power source 110 to switch between the regulated primary power 111 and the regulated auxiliary power 112, both produced by the welding power source 110.

The welding wire feeder 300 further includes a means for electrically grounding the auxiliary welding tool 130 to a workpiece 170. Referring to FIG. 2, such means may include an electrical connector 370 adapted to electrically connect with the auxiliary work cable 180 which electrically interfaces with the workpiece 170. The connector 370 electrically interfaces with the connector 330 for the auxiliary welding tool 130 such that the auxiliary welding tool 130 may be grounded to the workpiece 170, as shown in FIG. 2. Other equivalent means are possible as well, in accordance with various alternative embodiments of the present invention. Similarly, the work cable 190 is used to electrically ground the power source 110 to the workpiece 170.

When primary power 111 is connected to the primary welding tool 140 via the power splitter 340, a first closed electrical path is established when an electrode of the primary welding tool 140 touches the workpiece 170 or when an arc is established between an electrode of the primary welding tool 140 and the workpiece 170. The first closed electrical path runs from the power source 110 through the electrode cable 120, into the electrode connector 310 of the welding wire feeder 300, through a first branch of the power splitter 340 to the connector 320, into the primary welding tool 140, to the workpiece 170 (either via a direct short or an arc), through the work cable 190, and back to the power source 110.

When auxiliary power 112 is connected to the auxiliary welding tool 130 via the power splitter 340, a second closed electrical path is established. The second closed electrical path runs from the power source 110, through the electrode cable 120, into the electrode connector 310 of the welding wire feeder 300, through a second branch of the power splitter 340 to the connector 330, into the auxiliary welding tool 130, out of the auxiliary welding tool 130, back to the connector 330, to the connector 370, through the auxiliary work cable 180, to the workpiece 170, through the work cable 190, and back to the power source 110. In addition, the wire feeder 300 may include a safety circuit or safety configuration to prevent primary power from being applied to the auxiliary welding tool 130, and to prevent auxiliary power from being applied to the primary welding tool 140.

Again, the same electrode cable 120 may be used to provide power for both the primary welding tool 140 and the auxiliary welding tool 130, instead of having two separate cables, one for the primary welding tool 140 and another for the auxiliary welding tool 130. Again, eliminating the need for an extra cable helps reduce the likelihood of tripping and electrical hazard in the work area.

Figure 3:
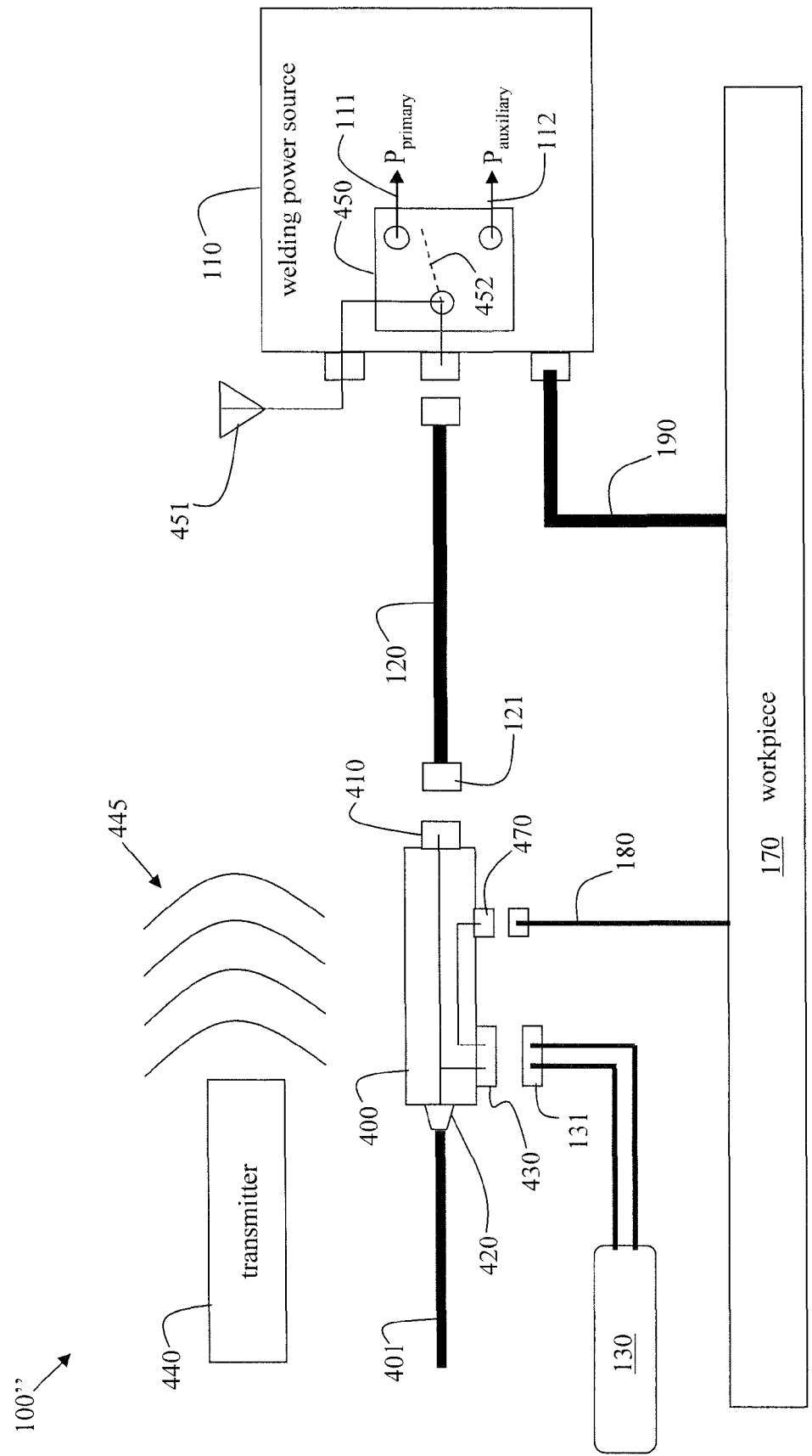
FIG. 3 is a schematic block diagram of an embodiment of an electrode holder, used in a welding system, capable of providing auxiliary electric power from a welding power source via an electrode cable to an auxiliary welding tool.

FIG. 3 is a schematic block diagram of an embodiment of an electrode holder 400, used in a welding system 100", capable of providing auxiliary electric power from a welding power source 110 via an electrode cable 120 to an auxiliary welding tool 130. The electrode holder 400 is for holding, for example, a stick electrode 401 during a welding operation. The electrode holder includes a stick electrode connector 420 adapted to hold the stick electrode 401 securely, allowing electric power to be provided to the stick electrode 401.

The electrode holder 400 further includes an electrode cable connector 410 adapted to electrically connect with a first electrical connector 121 at a distal end of the welding electrode cable 120 to provide electric power from the welding power source 110. The electrode holder 400 also includes an auxiliary welding tool connector 430 adapted to electrically connect with the third electrical connector 131 at a distal end of the auxiliary welding tool 130 (e.g., a cutter for cutting the workpiece). The electrode holder 400 is internally configured to feed electric power coming in to the electrode cable connector 410 to both the stick electrode 401 and the auxiliary welding tool 130.

The welding system 100" also includes means for remotely switching the electric power provided by the welding power source 110 between a regulated primary power 111 and a regulated auxiliary power 112. Such means may include, for example, a hand-held wireless transmitter 440 capable of wirelessly transmitting a switching signal 445 from the transmitter 440 to the welding power source 110. Such means may also include a wireless receiver 450, within or connected to the welding power source 110, capable of wirelessly receiving the switching signal 445 from the transmitter 440. The wireless transmitter 440 and the wireless receiver 450 may be radio frequency (RF) devices, for example, or may be infrared devices. Other equivalent means are possible as well, in accordance with various alternative embodiments of the present invention. The receiver 450 may include an antenna 451 for intercepting the signal 445, for example, if the signal 445 is an RF signal.

When the switching signal 445 is received at the welding power source 110, a power switch 452 is activated to switch from the regulated primary power 111 to the regulated auxiliary power 112, both produced in the welding power source 110, or vice versa. As a result, either regulated primary power 111 or regulated auxiliary power 112 may be provided via the electrode cable 120 to the electrode holder 400. When primary power 111 is provided, the stick electrode 401 may be used for welding. When auxiliary power 112 is provided, the auxiliary welding tool 130 may be used, for example, for grinding or cutting.

The system 100" and electrode holder 400 further include means for electrically grounding the auxiliary welding tool 130 to a workpiece 170. Referring to FIG. 3, such means may include an electrical connector 470 adapted to electrically connect with the auxiliary work cable 180 which electrically interfaces with the workpiece 170. The connector 470 electrically interfaces with the connector 430 for the auxiliary welding tool 130 such that the auxiliary welding tool 130 may be grounded to the workpiece 170, as shown in FIG. 3. Other equivalent means are possible as well, in accordance with various alternative embodiments of the present invention. Similarly, the work cable 190 is used to electrically ground the power source 110 to the workpiece 170.

When primary power 111 is connected to the stick electrode 401, a first closed electrical path is established when the stick electrode 401, held by the electrode holder 400, touches the workpiece 170, or when an arc is established between the stick electrode 401 and the workpiece 170. The first closed electrical path runs from the power source 110 through the electrode cable 120, into the electrode connector 410 of the electrode holder 400, through the electrode holder 400, to the connector 420, into the stick electrode 401, to the workpiece 170 (either via a direct short or an arc), through the work cable 190, and back to the power source 110.

When auxiliary power 112 is connected to the auxiliary welding tool 130, a second closed electrical path is established. The second closed electrical path runs from the power source 110 through the electrode cable 120, into the electrode connector 410 of the electrode holder 400, through the electrode holder 400, to the connector 430, into the auxiliary welding tool 130, out of the auxiliary welding tool 130, back to the connector 430, to the connector 470, through the auxiliary work cable 180, to the workpiece 170, through the work cable 190, and back to the power source 110. In addition, the electrode holder 400 may include a safety circuit or safety configuration to prevent primary power from being applied to the auxiliary welding tool 130, and to prevent auxiliary power from being applied to the stick electrode 401.

As a result, the same electrode cable 120 may be used to provide power for both the stick electrode 401, held by the electrode holder 400, and the auxiliary welding tool 130, instead of having two separate cables, one for the electrode holder 400 and another for the auxiliary welding tool 130. Again, eliminating the need for an extra cable helps reduce the likelihood of tripping and electrical hazard in the work area.

In summary, welding wire feeders and a stick electrode holder capable of providing auxiliary electric power from a welding power source via an electrode cable to an auxiliary welding tool are disclosed. A welding output of the welding power source may be switched between a regulated primary power and a regulated auxiliary power. An auxiliary welding tool, when connected to the welding wire feeder or the stick electrode holder, may use the regulated auxiliary power provided via the electrode cable when the regulated auxiliary power is selected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A welding wire feeder, said wire feeder comprising:
   an electrode cable connector adapted to electrically connect with a first electrical connector at a distal end of a welding electrode cable to provide electric power from a welding power source;
   a primary welding tool connector adapted to electrically connect with a second electrical connector at a distal end of a primary welding tool;
   an auxiliary welding tool connector adapted to electrically connect with a third electrical connector at a distal end of an auxiliary welding tool; and
   means for alternately switching said electric power, provided to said electrode cable connector via said electrode cable from said power source, between said primary welding tool connector and said auxiliary welding tool connector.

2. The welding wire feeder of claim 1 further comprising means for selecting said electric power, provided to said electrode cable from said welding power source, from at least a regulated primary power and a regulated auxiliary power.

3. The welding wire feeder of claim 1 wherein said means for alternately switching said electric power includes means for selecting said electric power, provided to said electrode cable from said welding power source, from at least a regulated primary power and a regulated auxiliary power.

4. The welding wire feeder of claim 1 further comprising means for electrically grounding said auxiliary welding tool to a workpiece.

5. The welding wire feeder of claim 1 wherein said primary welding tool comprises a welding gun.

6. The welding wire feeder of claim 1 wherein said auxiliary welding tool comprises a grinder.

7. The welding wire feeder of claim 3 wherein said means for selecting said electric power includes a control cable connector adapted to electrically connect with a fourth electrical connector at a distal end of a control cable to provide control signals between said wire feeder and said welding power source.

8. A welding system, said welding system comprising:
   a welding power source having an electrical power output to provide electric power;
   an electrode holder adapted to electrically connect with an auxiliary welding tool;
   an electrode cable adapted to electrically connect said electrode holder with said electrical power output of said welding power source to provide said electric power from said welding power source to said electrode holder and said auxiliary welding tool; and
   means for remotely switching said electric power provided by said welding power source between a regulated primary power and a regulated auxiliary power.

9. The system of claim 8 wherein said means for remotely switching includes a wireless transmitter capable of wirelessly transmitting a switching signal from said transmitter to said welding power source.

10. The system of claim 9 wherein said means for remotely switching includes a wireless receiver within said welding power source capable of wirelessly receiving said switching signal from said transmitter.

11. The system of claim 8 further comprising means for electrically grounding said auxiliary welding tool to a workpiece.

12. The system of claim 8 wherein said auxiliary welding tool comprises a grinder.

13. The system of claim 8 wherein said electrode holder is further adapted to hold a stick electrode.

14. The system of claim 8 further comprising a work cable adapted to electrically ground said power source to a workpiece.

\* \* \* \* \*